United States Patent [19]

Hashimoto

[11] Patent Number: 4,823,398

[45] Date of Patent: Apr. 18, 1989

[54] DIVERSITY RECEIVER

[76] Inventor: Kazuya Hashimoto, c/o NEC Corporation, 33-1, Shiba 5-chome, Minato-ku, Tokyo, Japan

[21] Appl. No.: 944,546

[22] Filed: Dec. 19, 1986

[30] Foreign Application Priority Data

Dec. 23, 1985 [JP] Japan ............................. 60-289832

[51] Int. Cl.$^4$ ............................................ H04B 11/16
[52] U.S. Cl. ................................... 455/134; 455/140; 455/343
[58] Field of Search ............... 455/132, 133, 134, 137, 455/343, 140, 272, 277, 278, 52, 65, 78, 84, 89, 127; 375/100

[56] References Cited

U.S. PATENT DOCUMENTS

| | | | |
|---|---|---|---|
| 4,035,728 | 7/1977 | Ishikawa et al. | 455/134 |
| 4,403,343 | 9/1983 | Hamada | 455/140 |
| 4,494,244 | 1/1985 | Arndt et al. | 455/78 |
| 4,633,519 | 12/1986 | Gotoh et al. | 455/134 |
| 4,756,023 | 7/1988 | Kojima | 455/134 |

FOREIGN PATENT DOCUMENTS

| | | | |
|---|---|---|---|
| 3203591 | 8/1983 | Fed. Rep. of Germany | 455/134 |
| 0184341 | 11/1982 | Japan | 455/134 |
| 0068328 | 4/1983 | Japan | 455/134 |

Primary Examiner—Robert L. Griffin
Assistant Examiner—Curtis Kuntz

[57] ABSTRACT

A diversity receiver includes first and second receivers, a first switch, a comparator, a second switch, and a controller. The first and second receiver have receiver antennas and generate demodulated signals and electric field detection outputs in accordance with received electric fields, respectively. The first switch performs switching between the demodulated signals from the first and second receivers in accordance with an output switching control signal and outputs a selected demodulated signal. The comparator compares the electric field detection outputs from the first and second receivers, respectively, and supplies the output switching control signal to the first switch. The second switch turns on/off a power source of the first receiver in accordance with a power source switching control signal. The controller receives the electric field detection output from the second receiver, calculates an average intensity of the electric field, and supplies the power source switching control signal to the second switch in accordance with the average intensity of the electric field.

4 Claims, 6 Drawing Sheets

DIVERSITY RECEIVER

BACKGROUND OF THE INVENTION

The present invention relates to a diversity receiver and, more particularly, to a diversity receiver which has two radio receivers and performs selective switching between demodulated outputs from the two radio receivers.

Conventionally, diversity receivers of this type can be grouped into those of a selection diversity type and those of an antenna diversity type. A selection diversity-type receiver has two radio receivers (referred to as "receivers" hereinafter), each of such receivers having an antenna and amplifier. The receiver demodulates an input signal received by its antenna in order to output a demodulated signal when it is supplied with power (i.e., is switched ON) and generates an electric field intensity output in accordance with the intensity of the electric field. The selection diversity-type receiver; compares the electric field detection outputs from the two receivers while the two receivers are constantly ON, and performs switching in order to select a demodulated output from a receiver having a higher electric field detection output. When the intensity of the received electric field is high, since the degradation in S/N ratio of the reception signal due to fading is small, no advantage is obtained in performing diversity signal reception. Despite this, in the conventional diversity receiver, the power sources for the two receivers are constantly ON regardless of the intensity of the received electric field. Therefore, when the intensity of the received electric field is high, excessive power is consumed.

In an antenna diversity-type receiver, any of a plurality of antennas is connected to a single receiver. When the quality of communication of the selected antenna is degraded below a predetermined value, it is switched to another antenna, thereby restoring predetermined quality of communication. Since only a single receiver is provided, power consumption is small. However, quality of communication is not so improved much as in the selection diversity-type receiver.

SUMMARY OF THE INVENTION

It is an object of the present invention to provide a diversity receiver wherein the drawbacks of the conventional techniques are removed, power consumption is reduced, and quality of communication is improved.

The diversity receiver according to the present invention comprises: first and second receivers having receiver antennas and generating demodulated signals and electric field detection outputs in accordance with received electric fields, respectively; a first switch for switching between the demodulated signals from the first and second receivers in accordance with an output switching control signal and outputting a selected one of the demodulated signals; comparing means for comparing the electric field detection outputs from the first and second receivers, respectively, and supplying the output switching control signal to the first switch in accordance with the result of the comparison; a second switch for turning on/off a power supply source of the first receiver in accordance with a power source switching control signal; and a controller for receiving the electric field detection output from the second receiver, averaging intensity of the received electric field, and supplying the power source switching control signal to the second switch in accordance with the average intensity of the electric field.

DETAILED DESCRIPTION OF THE PREFERRED EMBODIMENTS

Figure 1:
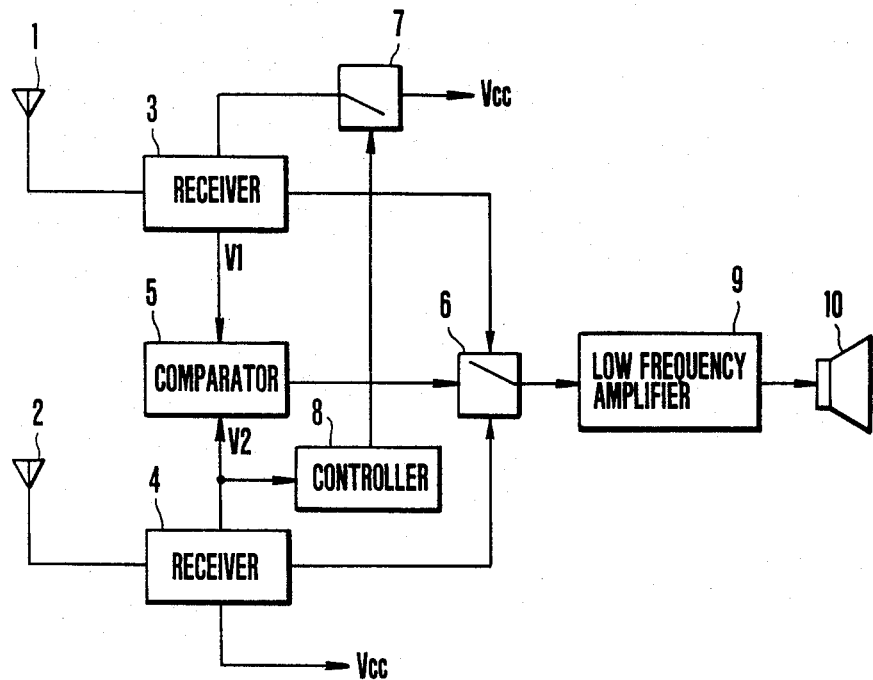
FIG. 1 is a block diagram of an embodiment of the present invention.

FIG. 1 is a block diagram of a selection diversity type receiver according to an embodiment of the present invention. Referring to FIG. 1, reference numerals 1 and 2 denote antennas; 3 and 4, receivers; 5, a comparator; 6 and 7, switches; 8, a controller; 9, a low frequency amplifier; and 10, a loudspeaker.

The signals received by the antennas 1 and 2 are amplified and demodulated by the receivers 3 and 4, respectively. Electric field detection outputs V1 and V2 generated by the receivers 3 and 4 are compared with each other by the comparator 5, and the switch 6 is switched so that the demodulated output of the receiver whose electric field detection output voltage is higher than the other is selected. The demodulated output selected by the switch 6 is amplified by the low frequency amplifier 9 and output from the loudspeaker 10.

Figure 8:
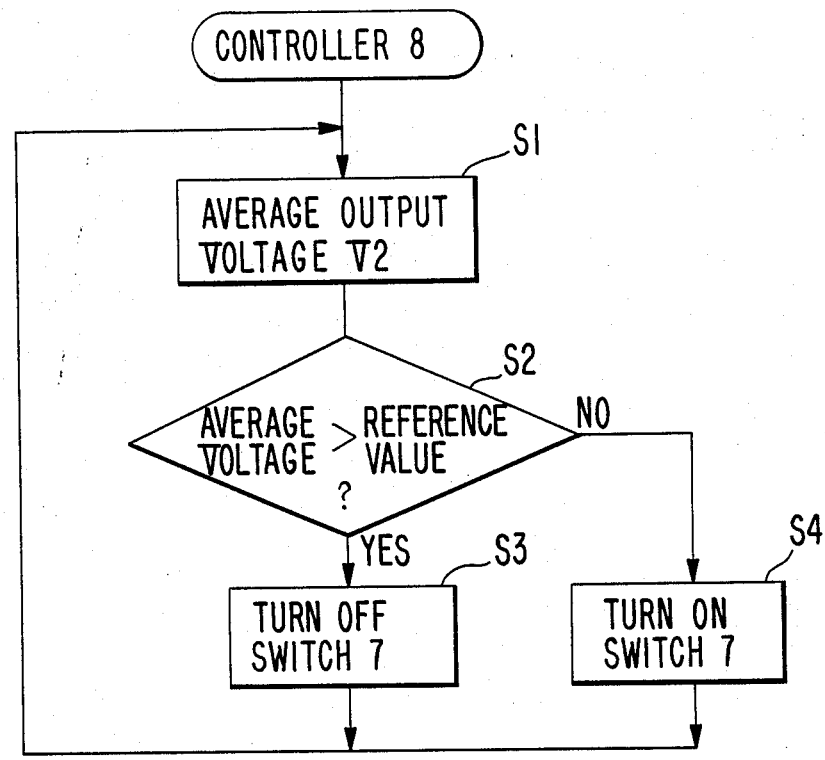
FIG. 8 is a flow chart showing the function of the controller in FIGS. 1 and 2.

The electric field detection output V2 from the receiver 4 is also supplied to the controller 8. FIG. 8 is a flowchart showing the function of the controller 8; The controller 8 averages the voltages of the electric field detection output V2 to obtain an average electric field detection output voltage (S1), and compares it with a predetermined reference voltage (S2). The controller 8 generates a control signal to turn off the switch 7 when the average electric field detection output voltage is higher than the reference voltage (S3), and to turn on the switch 7 when the average electric field detection output voltage is lower than or equal to the reference voltage (S4). When the switch 7 is turned on, diversity signal reception is performed. When the switch 7 is turned off, the electric field detection output V1 of the receiver 3 becomes 0 and the comparator 4 constantly selects the demodulated signal from the receiver 4.

Figure 2:
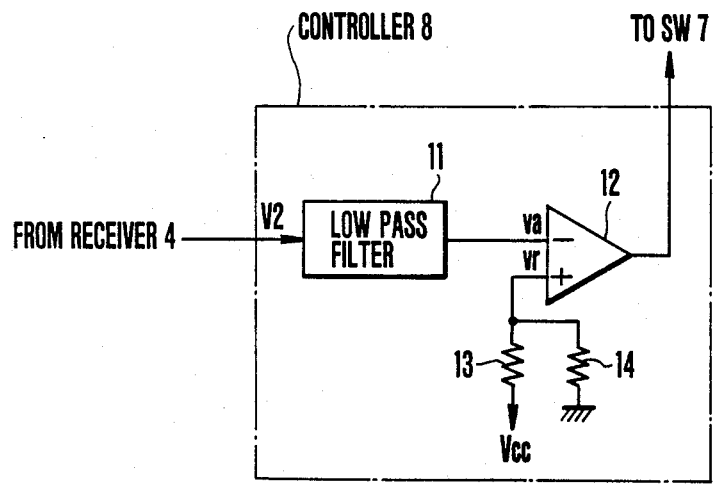
FIG. 2 is a circuit diagram of an example of a controller shown in FIG. 1.

FIG. 2 is a circuit diagram showing in detail an example of the controller 8. When the electric field detection output V2 is supplied from the receiver 4 to the controller 8, it is integrated by a low pass filter 11 to obtain an average electric field detection output voltage Va which is input to the inverting input terminal of a comparator 12. The non-inverting input terminal of the comparator 12 receives a reference voltage Vr obtained by dividing a power source voltage Vcc by resistors 13 and 14. When the average electric field detection output Va is smaller than the reference voltage Vr, the comparator 12 outputs a signal of high level "H" and turns on the switch 7. When the average electric field detection output voltage Va is larger than the reference voltage Vr, the comparator 12 outputs a signal of low level "L" and turns off the switch 7.

As described above, according to this embodiment, when the intensity of the input electric field is higher than a preset reference, the power source for the first receiver is turned off and reception is performed only by the second receiver. Therefore, the power consumption is reduced.

Figure 3:
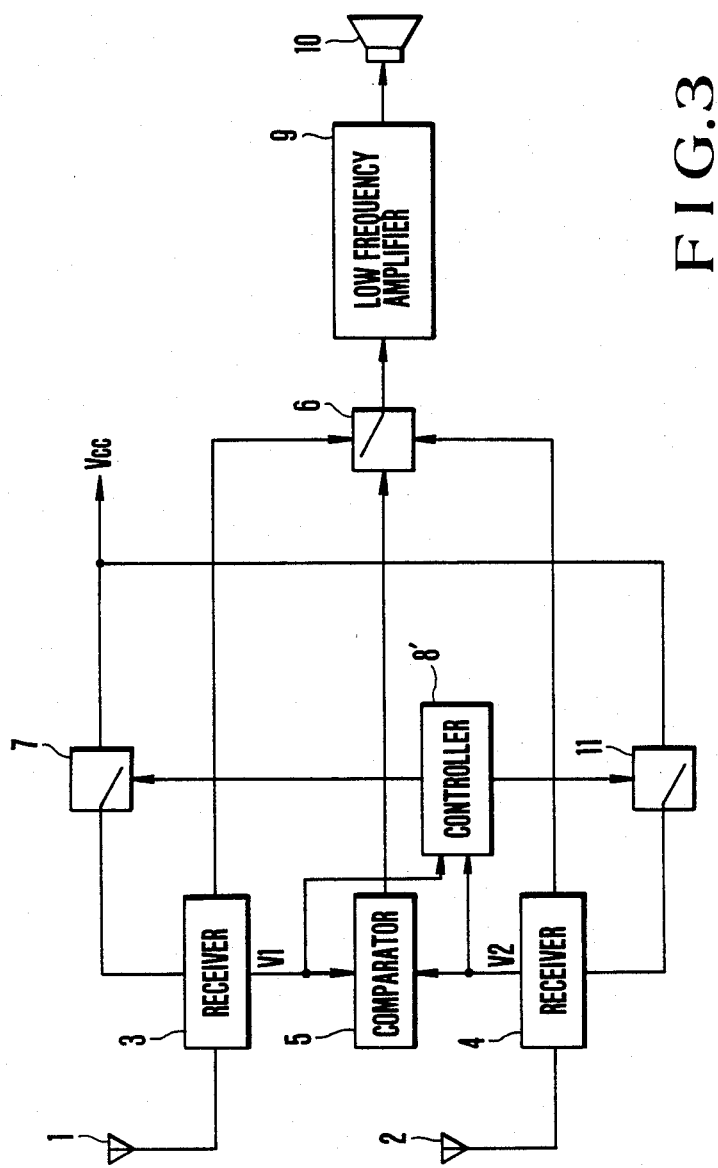
FIG. 3 is a block diagram of another embodiment of the present invention.

FIG. 3 is a block diagram of a diversity receiver according to another embodiment of the present invention.

In FIG. 3, the same reference numerals denote the same components as in FIG. 1.

This embodiment is different from that of FIG. 1 in the following points. Particularly, in FIG. 3, outputs V1 and V2 from receivers 3 and 4 are supplied to a controller 8'. A power source voltage Vcc for the receiver 4 is supplied through a switch 11 which is controlled by the controller 8'.

The signals received by the antennas 1 and 2 are amplified and demodulated by the receivers 3 and 4, respectively. Electric field detection outputs V1 and V2 generated by the receivers 3 and 4 are compared with each other by a comparator 5, and a switch 6 is switched so that the demodulated output of the receiver whose electric field detection output voltage is higher than the other is selected. The demodulated output selected by the switch 6 is amplified by a low frequency amplifier 9 and output from a loudspeaker 10.

The electric field detection outputs V1 and V2 from the receivers 3 and 4 are supplied to the controller 8'. The controller 8' averages the voltages of the electric field detection outputs V1 and V2 to obtain average electric field detection outputs V1 and V2, respectively, and compares them with a preset reference voltage Vr.

(1) When V1<Vr and V2<Vr, the switches 7 and 11 are turned on and selective diversity signal reception is performed.

(2) When V1<Vr and V2>Vr, the switches 7 and 11 are turned off and on, respectively, and only the second receiver 4 is enabled.

(3) When V1>Vr and V2<Vr, the switches 7 and 11 are turned on and off, respectively, and only the first receiver 3 is enabled.

(4) When V1 >Vr and V2 >Vr, V1 and V2 are compared, and
  when V1 >V2, the switches 7 and 11 are turned on and off, respectively, and only the first receiver 3 is enabled; and
  when V1<V2, the switches 7 and 11 are turned off and on, respectively, and only the second receiver 4 is enabled.

Figure 4:
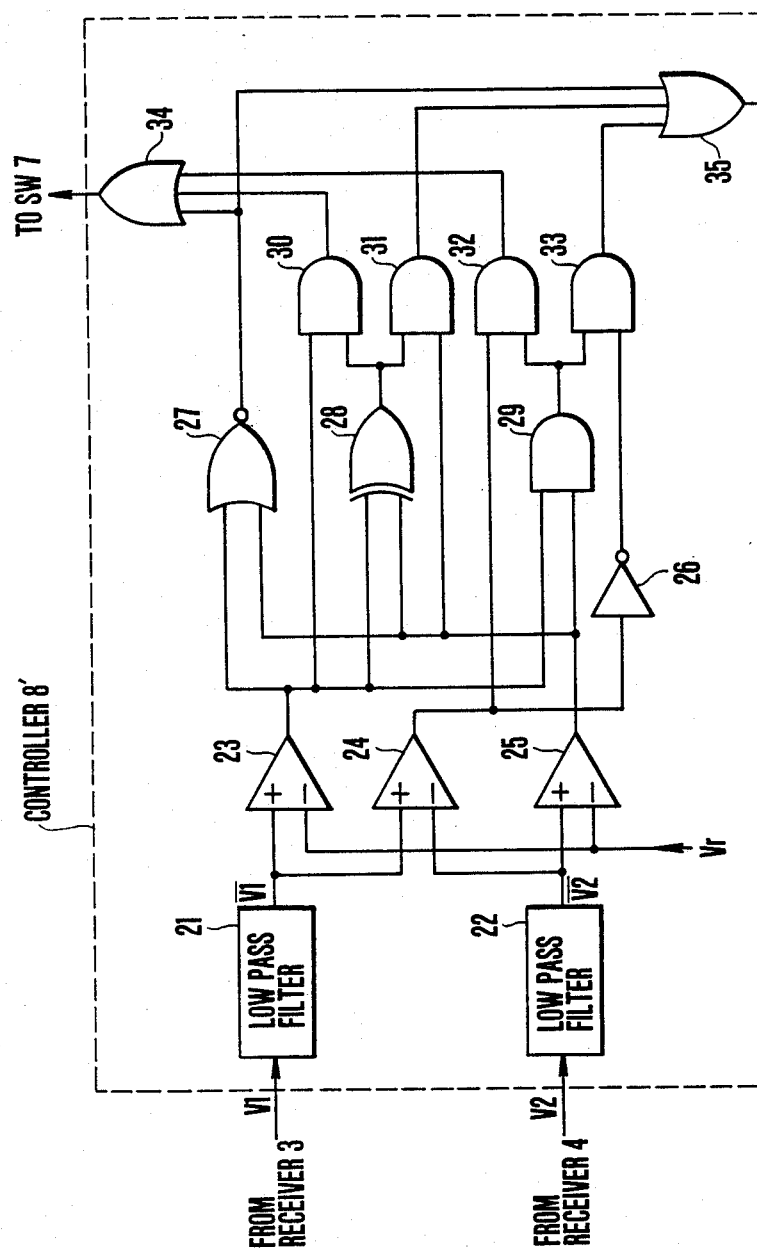
FIG. 4 is a circuit diagram of an example of a controller shown in FIG. 3.

FIG. 4 shows an example of the controller 8' for practicing the above operation. Referring to FIG. 4, reference numerals 21 and 22 denote low pass filters; 23, 24, and 25, comparators; 26, an inverter; 27, a NOR gate; 28, an exclusive OR gate; 29 to 33, AND gates; and 34 and 35, OR gates. In the controller 8' shown in FIG. 4, the outputs from the low pass filters 21 and 22 respectively correspond to $\bar{V}1$ and $\bar{V}2$ obtained by averaging their input voltages V1 and V2 over time. The comparators 23, 24, and 25 respectively compare $\bar{V}1$ with the reference voltage Vr, $\bar{V}1$ with $\bar{V}2$, and $\bar{V}2$ with Vr.

(1) When $\bar{V}1<Vr$ and $\bar{V}2<Vr$,
the outputs from the comparators 23 and 25 are respectively at level "L" and the output from the comparator 24 is at level "L" or "H". Therefore, the outputs from the NOR gate 27, the exclusive OR gate 28, and the AND gate 29 are respectively at levels "H", "L", and "L", and the output from the inverter 26 is at level "H" or "L". Therefore, the outputs from the AND gates 30, 31, 32, and 33 are at level "L", and the outputs from the OR gates 34 and 35 are at level "H". Thus, the switches SW7 and SW11 are turned on, thus enabling diversity reception.

(2) When $\bar{V}1<Vr$ and $\bar{V}2>Vr$,
the outputs from the comparators 23, 24, and 25 are respectively at levels "L", "L", and "H". Therefore, the outputs from the inverter 26, the NOR gate 27, the exclusive OR gate 28, and the AND gate 29 are respectively at levels "H", "L", "H", and "L". The outputs from the AND gates 30, 31, 32, and 33 are respectively at levels "L", "H", "L", and "L". Therefore, the outputs from the OR gates 34 and 35 are at levels "L" and "H", respectively, and the switch SW7 is turned off and the switch SW11 is turned on, thus enabling only the second receiver.

(3) When $\bar{V}1>Vr$ and $\bar{V}2<Vr$,
the outputs from the comparators 23, 24, and 25 are at levels "H", "H", and "L", and hence, the outputs from the inverter 26, the NOR gate 27, the exclusive OR gate 28, and the AND gate 29 are respectively at levels "L", "L", "H", and "L". Therefore, the outputs from the AND gates 30, 31, 32, and 33 are at levels "H", "L", "L", and "L", respectively, and the outputs from the OR gates 34 and 35 are at levels "H" and "L", respectively. Thus, the switches SW7 and SW11 are turned on and off, respectively, and only the first receiver is enabled.

(4) When $\bar{V}1>Vr$ and $\bar{V}2 >Vr$,
the outputs from the comparators 23 and 25 are at level "H", and the output from the comparator 24 is at level "H" (if $\bar{V}1 >\bar{V}2$) or at level "L" (if $\bar{V}1 <\bar{V}2$). Therefore, the output from the inverter 26 is at level "L" or "H", and the outputs from the NOR gate 27, exclusive OR gate 28, and the AND gate 29 are respectively at levels "L", "L", and "H". Thus, the outputs from the AND gates 30, 31, 32, and 33 are respectively at "L", "L", "H" or "L", and "L" or "H". The output from the OR gate 34 is at level "H" if $\bar{V}1 >\bar{V}2$ and is at "L" if $\bar{V}1 <\bar{V}2$, and the output from the OR gate 35 is at level "L" if $\bar{V}1 >\bar{V}2$ and is at "H" if $\bar{V}1 <\bar{V}2$. Therefore, if $\bar{V}1 >\bar{V} 2$, the switches SW7 and SW11 are respectively turned on and off, and only the first receiver is enabled. If $\bar{V}1<\bar{V}2$, the switches SW7 and SW11 are respective turned off and on, and only the second receiver is enabled.

Figure 5:
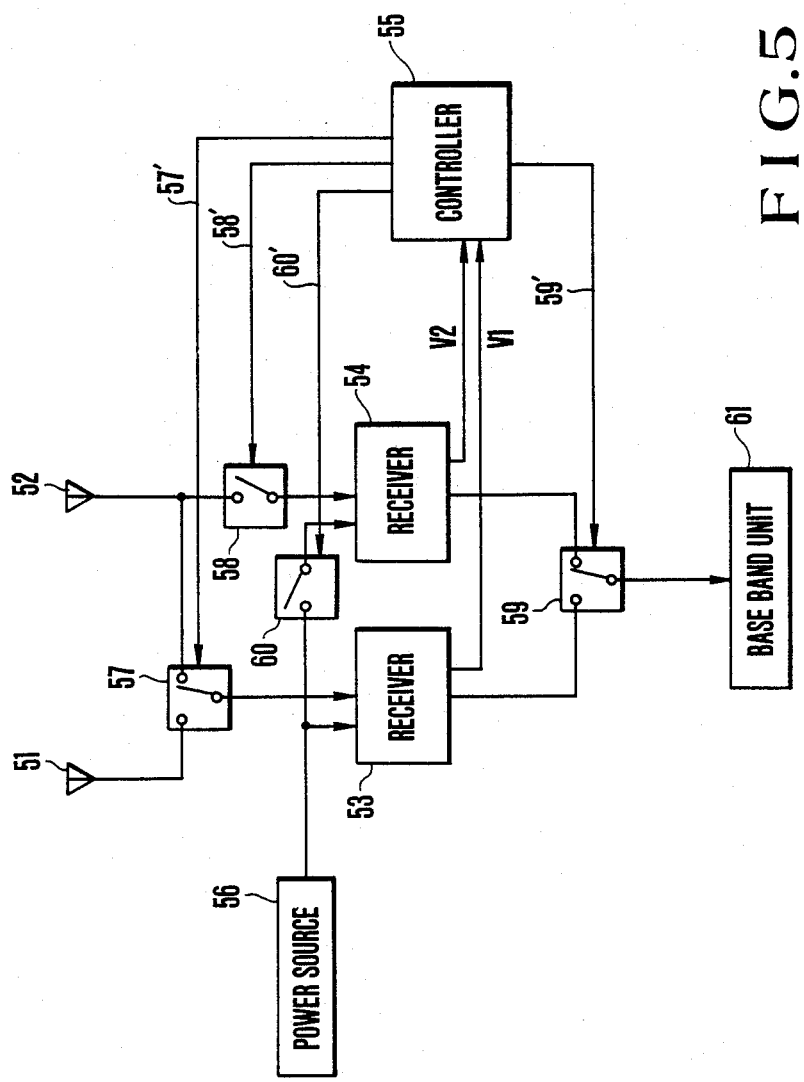
FIG. 5 is a block diagram of still another embodiment of the present invention.

FIG. 5 is a block diagram of still another embodiment of the present invention. Either an antenna 51 or 52 is connected to a receiver 53 through a switch 57. The antenna 52 and a receiver 54 are connected to each other through a switch 58. A demodulated output from either the receiver 53 or 54 is connected to a base band unit 61 through a switch 59. A controller 55 receives received electric field detection outputs V1 and V2 from the receivers 53 and 54, respectively, and calculates an average electric field intensity within a predetermined period of time. The controller 55 controls switches 57, 58, 59, and 60 through control lines 57', 58', 59', and 60' in order to perform an antenna switching diversity operation when the average intensity of the electric field is higher than a predetermined value, and to perform a selective diversity operation when the average intensity of the electric field is lower than the predetermined value.

In the antenna switching diversity operation mode, the switch 58 is turned off, the switch 59 connects the receiver 53 with the base band unit 61, and the switch 60 disconnects a power source 56 and the receiver 54. When the electric field intensity detection output from the receiver 53 becomes less than a predetermined value, the switch 57 is controlled to switch to another antenna.

In the selective diversity operation mode, the switch 57 connects the antenna 51 with the receiver 53, the switch 58 connects the antenna 52 with the receiver 54, and the switch 60 is turned on. The controller 55 controls the switch 59 so that a larger received electric field detection output of the two outputs from the receivers 3 and 4 is connected to the base band unit 61.

Figure 6:
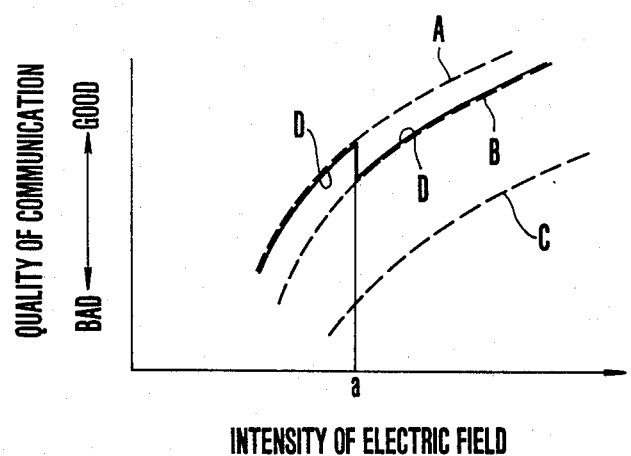
FIG. 6 is a graph wherein the quality of communication in the embodiment shown in FIG. 5 is compared with that of a conventional receiver.

FIG. 6 is a graph showing the relationship between the intensity of the electric field and the quality of communication in the present invention in comparison with that in the case of a conventional technique. Referring to FIG. 6, broken lines A, B, and C indicate the cases of selective diversity, antenna switching diversity, and reception without diversity, respectively, and a solid line D indicates the case of the present invention. Note that reference symbol a indicates an average intensity of electric field for switching between antenna switching and selective diversity operations. As is seen from FIG. 6, generally when the intensity of electric field is low, degradation in quality of communication is considerable. However, according to the present invention, since both antenna switching and selective diversity operations are employed, even if the intensity of the electric field is low, a higher quality of communication can be maintained compared with a case of an antenna switching diversity receiver.

Figure 7:
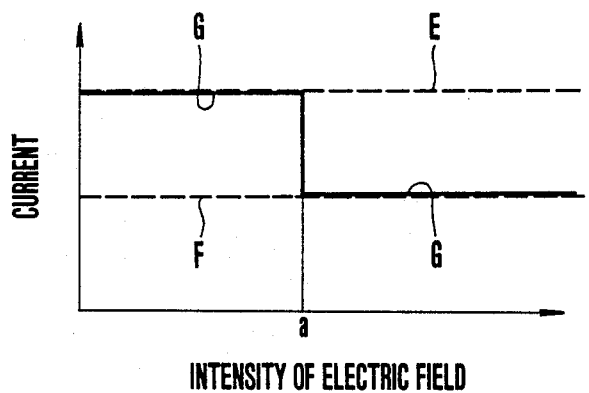
FIG. 7 is a graph wherein the power consumption of the embodiment shown in FIG. 5 is compared with that of the conventional receiver.

FIG. 7 is a graph showing the relationship between the intensity of the electric field and the power consumption in the present invention in comparison with that in the case of the conventional technique. Referring to FIG. 7, broken lines E and F indicate cases of selective and antenna switching diversity operations, respectively, and a solid line E indicates the case of the present invention. In this manner, according to the present invention, the power consumption can be decreased below that of a selective diversity receiver.

What is claimed is:

1. A diversity receiver comprising:
   a first receiver having a first antenna and generating a first demodulated signal and a first electric field detection output in accordance with an electric field received by said first antenna;
   a second receiver having a second antenna and generating a second demodulated signal and a second electric field detection output in accordance with an electric field received by said second antenna;
   a first switch for selecting between the first and second demodulated signals from said first and second receivers in accordance with an output switching control signal and outputting the selected one of the first and second demodulated signals;
   comparing means for comparing the first and second electric field detection outputs from said first and second receivers respectively, and supplying the output switching control signal to said first switch in accordance with the result of said comparison;
   a second switch for turning on/off a power supply source of said first receiver in accordance with a power source switching control signal; and
   a controller for receiving the second electric field detection output from said second receiver to average an intensity of the electric field received by said second antenna, and to supply the power source switching control signal to said second switch to turn on said second switch when the average intensity of the electric field is higher than a reference voltage and to turn off said second switch when the average intensity of the electric field is lower than or equal to the reference voltage.

2. A diversity receiver according to claim 1, wherein said controller comprises a low pass filter for filtering the second electric field detection output from said second receiver, and a comparator for comparing an output from said low pass filter with the predetermined reference voltage to output the power source switching signal.

3. A diversity receiver comprising: first and second antennas;
   a first receiver for amplifying and demodulating an input signal received by said first or second antenna to output a first demodulated signal, and for detecting an intensity of an electric field to generate a first electric field intensity output;
   a second receiver for amplifying and demodulating an input signal received by said second antenna to output a second demodulated signal, and for detecting an intensity of an electric field to generate a second electric field intensity output;
   an output switch for selecting one of said first and second output demodulated signals from said first and second receivers in accordance with an output switching control signal;
   a first input switch for selecting said first or second antenna and connecting the selected antenna to said first receiver;
   a second input switch for turning on/off a connection between said second antenna and said second receiver;
   a power source switch for turning on/off a power source of said second receiver; and
   a controller for receiving the first and second electric field intensity outputs from said first and second receivers to control the ON/OFF switching of said output switch, said first and second input switches and said power source switch, such that, when an average electric field intensity is higher than a predetermined value, an antenna switching diversity operation is performed by turning off said second input switch, rendering said output switch to select said first receiver, turning off said power source switch, and rendering said first input switch to switch from one to another of said first and second antennas in accordance with the magnitudes of the first and second electric field intensity outputs, and, when the average electric field intensity is lower than or equal to the predetermined value, a selective diversity operation is performed by rendering said first and second input switches to connect said first antenna with said first receiver and said second antenna with said second receiver, respectively, turning on said power source switch, and causing said output switch to select a larger one of said first and second electric field intensity outputs.

4. A diversity receiver comprising:

a first receiver having a first antenna and generating a first demodulated signal and a first electric field detection output in accordance with an electric field received by said first antenna;

a second receiver having a second antenna and generating a second demodulated signal and a second electric field detection output in accordance with an electric field received by said second antenna;

a first switch for selecting between the first and second demodulated signals from said first and second receivers in accordance with an output switching control signal and outputting a selected one of the first and second demodulated signals;

comparing means for comparing the electric field detection outputs from said first and second receivers, respectively, and supplying the output switching control signal to said first switch in accordance with the result of said comparison;

first and second power source switches for turning on/off a power source of said first and second receivers in accordance with first and second power source switching control signals, respectively; and a controller for receiving the first and second electric field detection outputs from said first and second receivers, and supplying the first and second power source switching control signals to said first and second power source switches in accordance with the magnitudes of the first and second electric field detection outputs, said controller comprising:

first and second low pass filters for generating average voltages V1 and V2 of the electric field detection outputs form said first and second receivers, respectively;

first and second comparators for comparing outputs from said first and second low pass filters with a reference voltage Vr;

a third comparator for comparing the outputs of the first and second low pass filters with each other; and a logic circuit for
  (1) turning on said first and second power source switches and performing selective diversity operation when V1<Vr and V2<Vr,
  (2) turning off and on said first and second power source switches, respectively, when V1<Vr and V2>Vr,
  (3) turning on and off said first and second power source switches, respectively, when V1>Vr and V2<Vr, and
  (4) comparing V1 with V2 when V1>Vr and V2>Vr, and turning on and off said first and second power source switches, respectively, when V1>V2 and turning off and on said first and second power sources, respectively when V1<V2.

* * * * *